Patented Sept. 11, 1928.

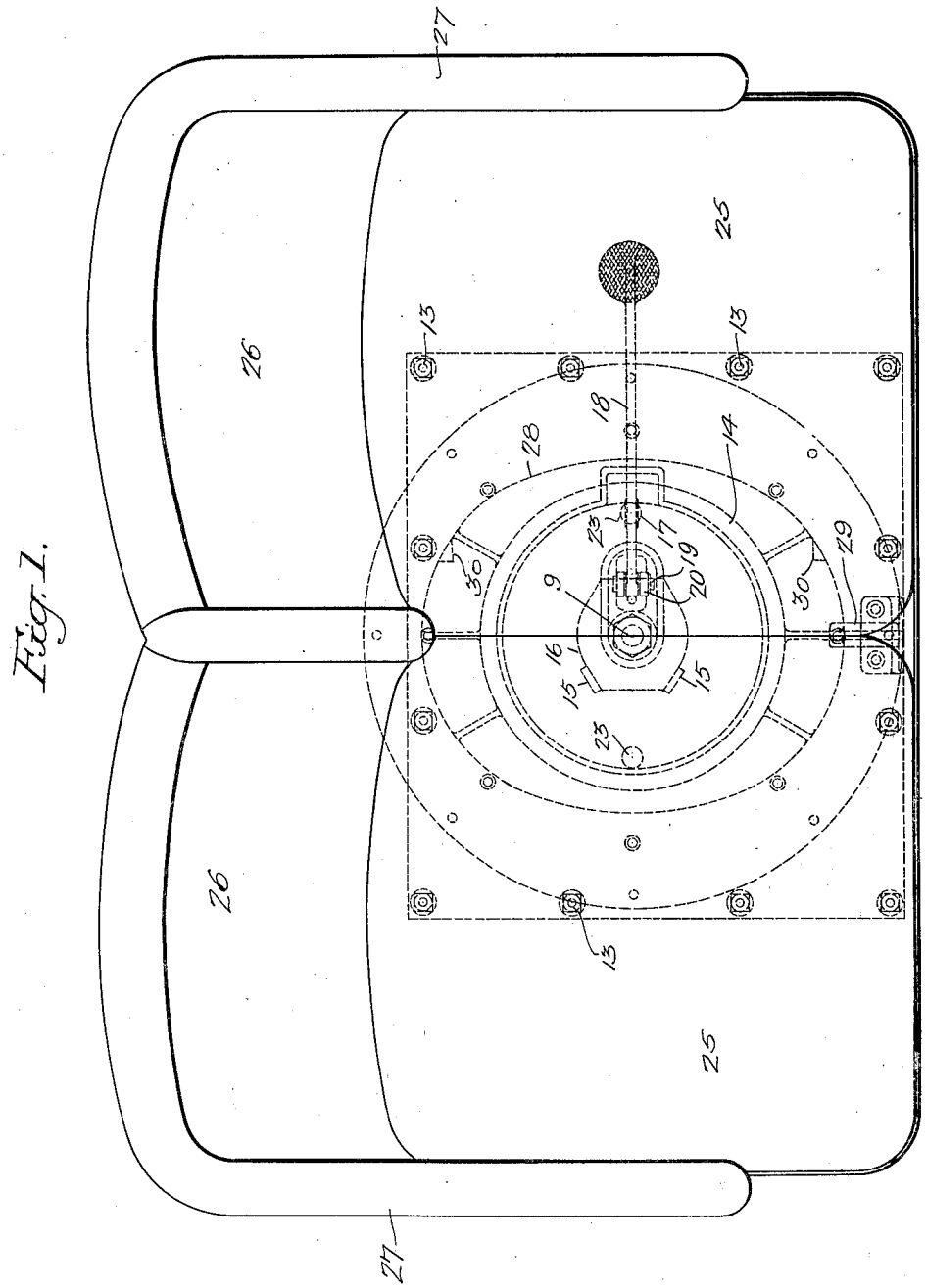

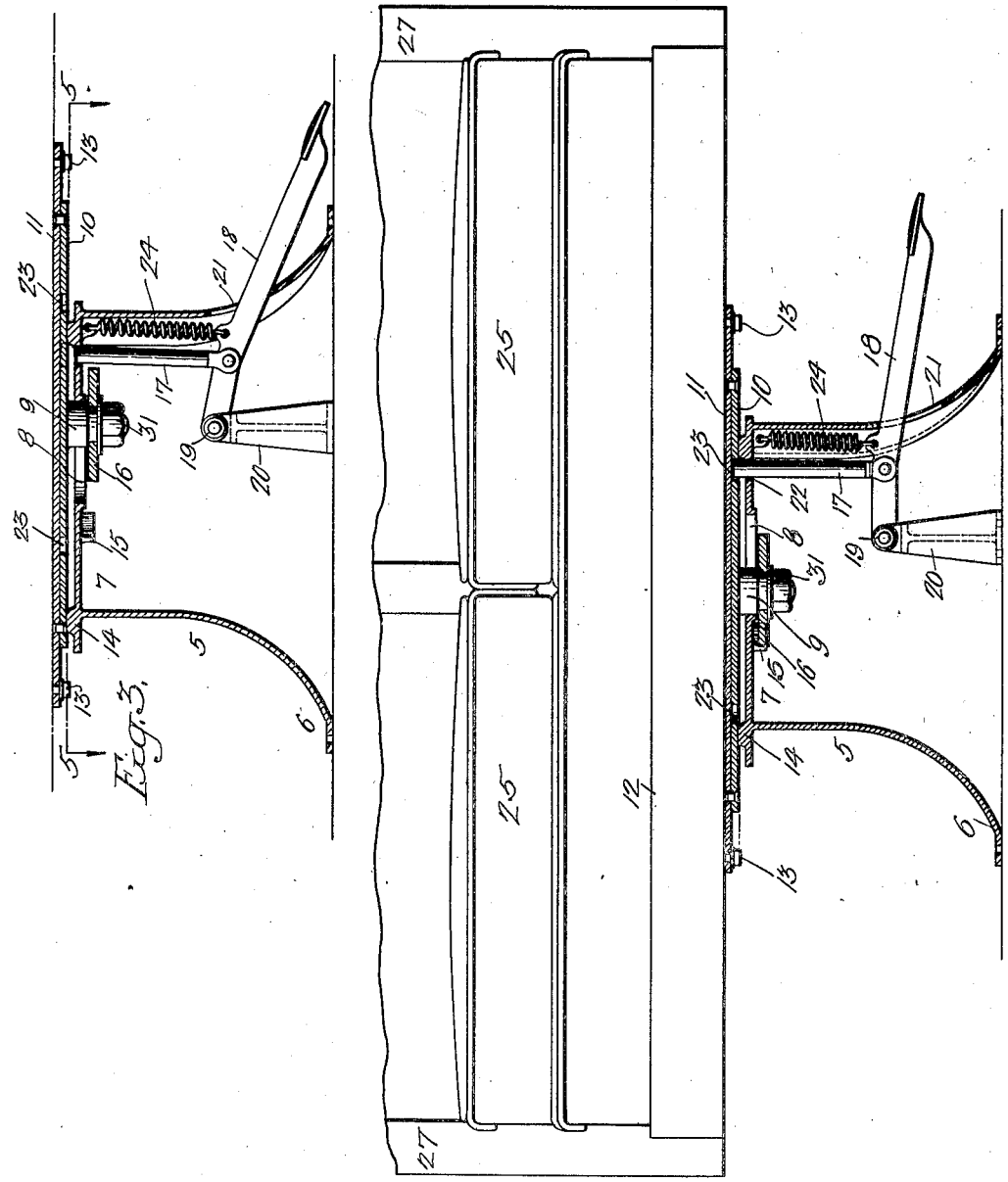

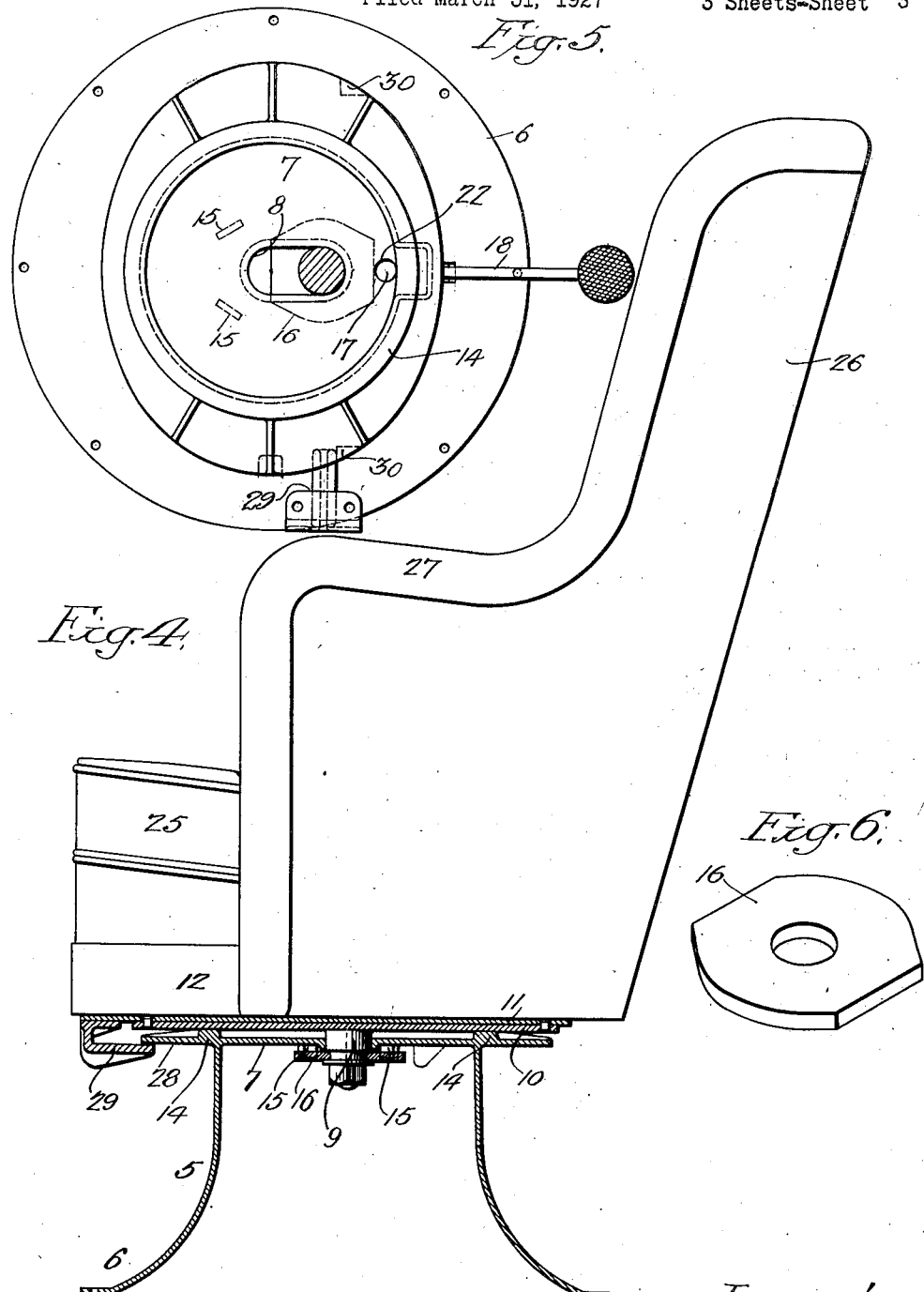

1,684,301

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR SEAT.

Application filed March 31, 1927. Serial No. 179,858.

The object of this invention is to so construct a seat for railway passenger cars, and other passenger vehicles, that the seat can be mounted upon a single pedestal, and which can be located close to the car body but which can be moved away from the side of the car body when it is desired to turn the seat.

In the accompanying drawings:

Fig. 1 is a plan view of a car seat illustrating my improvements;

Fig. 2 is a front elevation of the seat, the pedestal being in section, and the upper portion of the back being cut away;

Fig. 3 is a view similar to Fig. 2, the seat being moved away from the side of the car body to allow the seat to be turned;

Fig. 4 is a side view of the seat, the pedestal being in section;

Fig. 5 is a sectional plan view on the line 5—5, Fig. 3; and

Fig. 6 is a perspective view of the locking-plate.

The pedestal 5 has a flared base 6, and cast integrally with the pedestal is a platform 7 having an elongated slot 8, through which extends a pivot-pin 9 depending from a plate 10, which is secured in the present instance to a rectangular plate 11 firmly attached to the underside of the seat structure 12 by bolts 13 or other fastenings.

The platform 7 has an annular raised rail 14 upon which rests the plate 10. On the underside of the platform 7 are two lugs 15—15, between which is located a locking-plate 16 carried by the pivot-pin 9. When the locking-plate is in position betwen the lugs, the seat structure is locked from turning on the pedestal. When the seat structure and its plate are moved away from the side of the car body, the pivot-pin is moved in the slot 8 and the locking-plate 16 is moved clear of the lugs 15.

The seat structure is locked to the pedestal by a locking-bolt 17 which is pivoted to a foot-lever 18 pivoted at 19 to a bearing 20. The lever extends through a slot 21 in the pedestal 5 and has a foot pad at its outer end.

The bolt 17 extends through an opening 22 in the platform 7 and into one of the two openings 23 in the seat plate 10. The bolt is held in engagement with the seat plate 10 by a coiled spring 24 which is attached at one end to the foot-lever 18, and at the other end to a lug on the pedestal as shown in Fig. 2.

The seat structure has a seat section 25 and an inclined back section 26 and arms 27, which in the present instance do not extend to the front edge of the seat section. This form of seat is designed so that the seats can be arranged comparatively close together but yet allow them to be readily turned on their pedestal without one seat interfering with an adjoining seat, the front of the seat section passing under the inclined back of an adjoining seat structure.

The platform 7 has an oval flange 28 and on the seat plate 11 is a lug 29 which extends under the flange 28 at the front of the seat structure when the seat is in either of its two positions. When the seat structure is turned half-way on its pivot, the lug 29 is moved away from the flange 28.

On the pedestal are two stops 30 with which the lug 29 engages when moved to either of its two positions. The stops are clear of the lug when the seat is in its normal position close to the side of the car body. When in this position, the locking-plate 16 is located between the two lugs 15—15. As shown in Figs. 1, 5 and 6, the locking plate is double ended so that one end of the plate fits between the lugs when the seat is facing in one direction, and the other end fits between the lugs when the seat is facing in the opposite direction.

The seat structure is located normally in close proximity to the side of a car body, and in order to turn the seat so that it will face in the direction of the movement of the car, it must be moved away from the side of the car a sufficient distance to allow it to be turned. This is accomplished by first placing the foot on the lever 18 which withdraws the bolt 17. Then the seat structure is moved laterally on the rail 14, the pivot-pin 9 sliding in the slot 8 until it rests against the opposite end of the slot, and the locking-plate being withdrawn from contact with the lugs 15. The seat structure is then free to be turned upon its pivot when turned a half-turn. The seat is moved towards the side of the car body, the pin sliding in its slot and the locking-plate engaging the lugs again, thus allowing the bolt 17 to lock the seat structure against a sliding movement.

The locking-pate 16 is mounted between a shoulder on the pivot pin 9 and a washer and nut 31 on the end of the pin, but it may be otherwise fastened if desired.

I claim:

1. The combination in a seat, of a pedestal having a slotted platform, said platform having an annular rail thereon; a seat plate mounted on the rail and having a depending pivot pin extending through the slot in the platform; a double-ended locking plate on the pivot pin; lugs on the underside of the platform between which either end of the locking plate is located when the seat structure is in its normal position; and means for locking the seat plate against lateral movement.

2. The combination in a passenger vehicle seat structure, of a base having a platform; an oval flange projecting from the platform; a seat structure; and a lug on the seat structure arranged to extend under the elongated portions of the flange when the seat structure is in either of its two positions, said lug being free of the flange when the seat is turned half-way on its pivot.

WALTER S. ADAMS.